Patented Apr. 30, 1935

1,999,764

UNITED STATES PATENT OFFICE 1,999,764

MOTOR CONTROL SYSTEM

Erwin Kern, Ennetbaden, Switzerland, assignor to Aktiengesellschaft Brown Boveri & Cie., Baden, Switzerland, a joint-stock company of Switzerland Application December 21, 1933, Serial No. 703,345
In Germany December 24, 1932

19 Claims. (Cl. 172—274)

This invention relates in general to improvements in motor control systems and more particularly to the control of variable speed electric motors by means of discontinuously controllable electric valves.

It is well known to operate an electric motor, such as an alternating current motor of the so-called synchronous type, from a direct current or from an alternating current source through discontinuously controllable electric valves to obtain operation of such motor at continuously variable speeds. In such type of control, current is generally released through the anodes of the valves by means of control electrodes and is subsequently interrupted by the action of the counter-electromotive force of the motor windings. It is then generally necessary to adjust the control in a predetermined manner and the operation of the motor therefore cannot be regulated in any arbitrary manner. For instance, it is generally not possible to cause such a motor to draw leading current from an alternating current line.

By utilizing either control electrodes operable to interrupt the flow of current through the associated anodes, or other means independent of the motor, for commutating currents between the anodes of the valve, the regulation of the operation of the motor is greatly facilitated and the regulating range correspondingly increased.

It is therefore among the objects of the present invention to provide a control system for a variable speed electric motor in which the armature currents of the motor are controlled by a discontinuously controllable electric valve.

Another object of the present invention is to provide a control system for a variable speed electric motor in which currents flowing through a control valve may be interrupted by means independent of the motor.

Another object of the present invention is to provide a control system for a variable speed electric motor in which the currents flowing through a control valve may be interrupted by the action of control electrodes.

Another object of the present invention is to provide a control system for a variable speed electric motor in which currents flowing through a control valve may be interrupted by the discharge of capacitor means.

Another object of the present invention is to provide a control system for a variable speed electric motor in which the motor may be caused to draw either lagging or leading current from an alternating current supply line.

Figure 1:
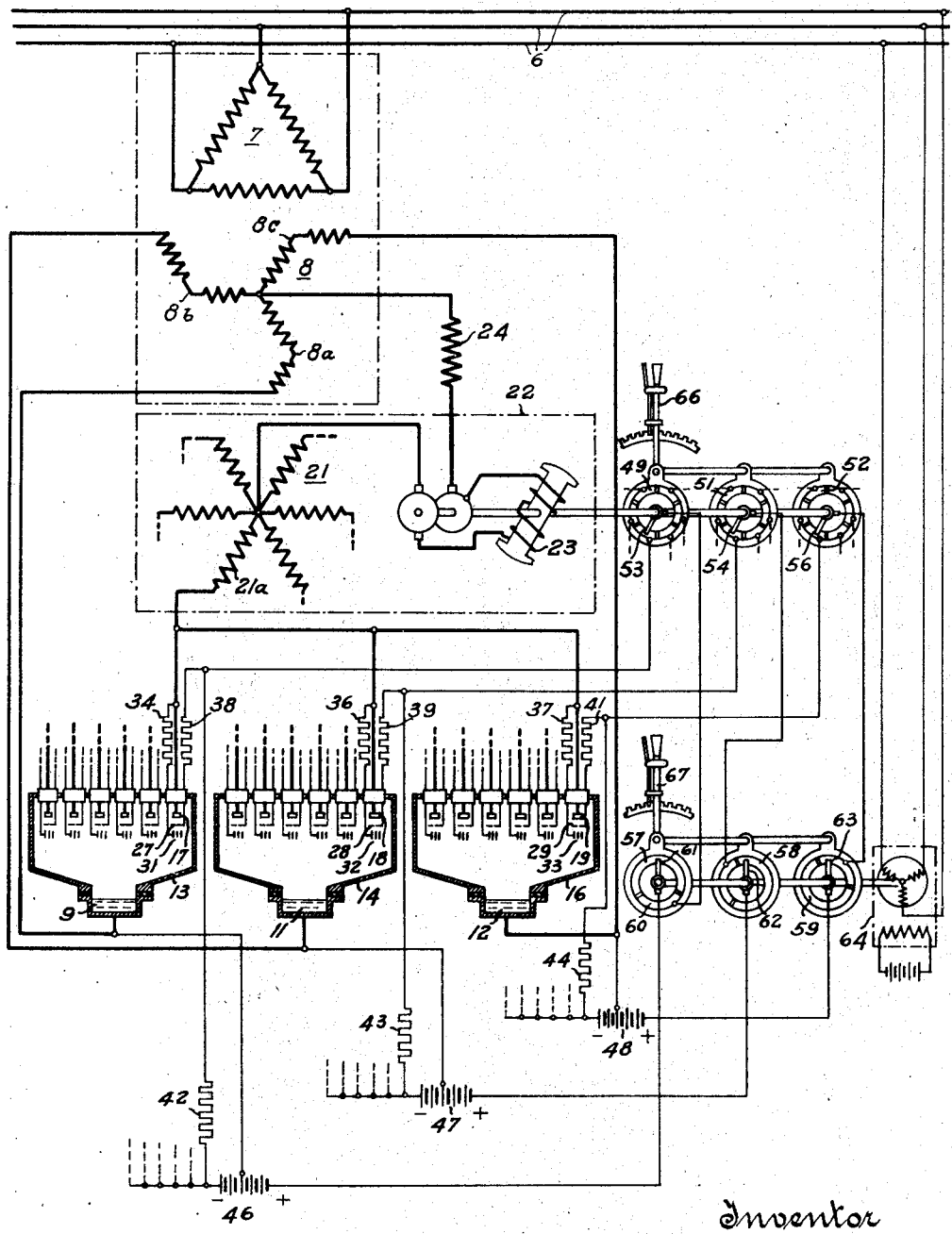
Figure 2:
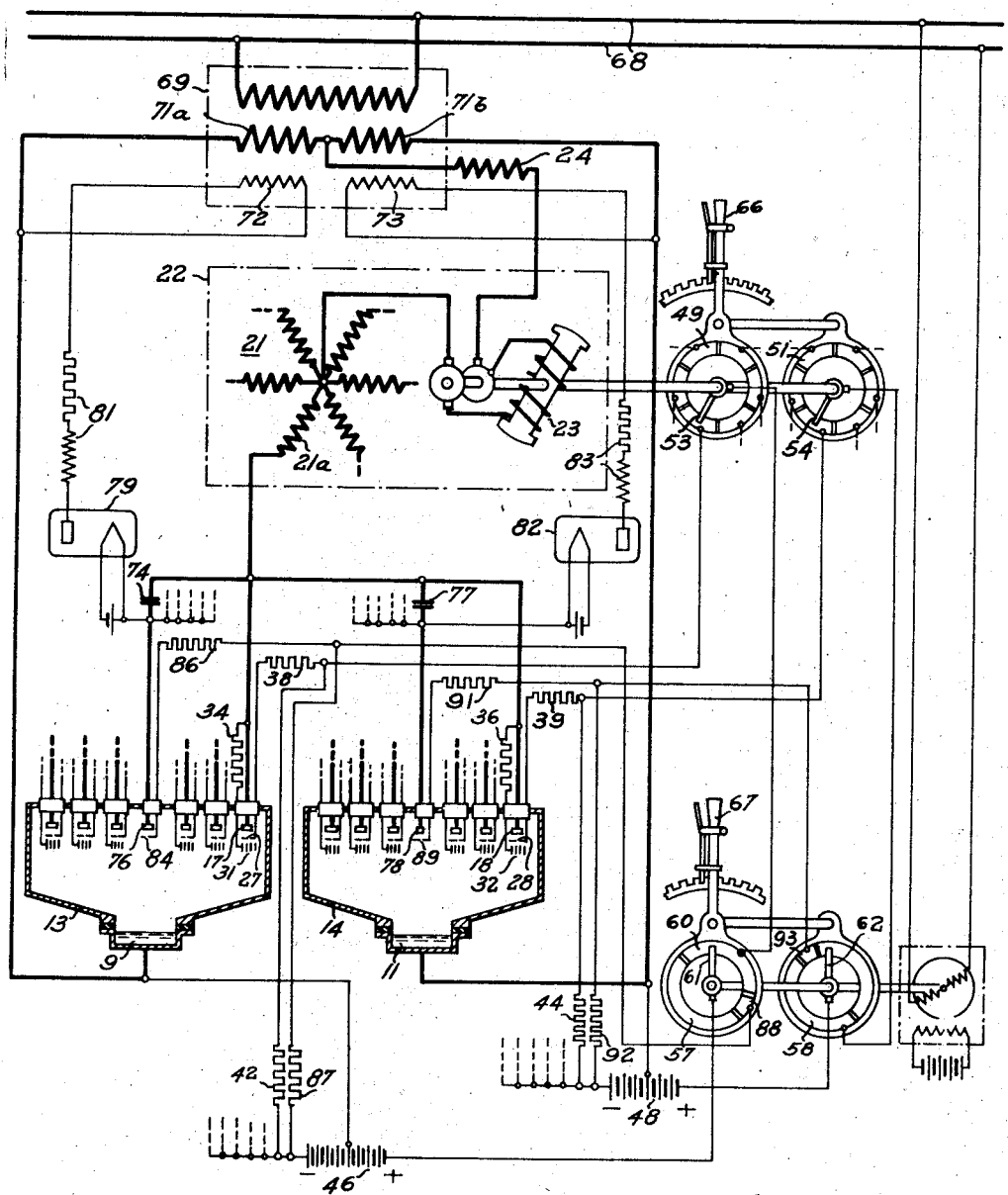

Objects and advantages other than those above set forth will be apparent from the following description when read in connection with the accompanying drawings, in which:

Fig. 1 diagrammatically illustrates one embodiment of the present invention applied to the control of a three-phase motor by means of electric valves provided with control electrodes each operable to interrupt the current flowing through the associated anode; and Fig. 2 diagrammatically illustrates a modified embodiment of the present invention applied to the control of a single phase motor in which the action of the control electrode is aided by the discharge of capacitors through auxiliary anodes of the valves.

Referring more particularly to the drawings by characters of reference, reference numeral 6 designates a three-phase alternating current supply line from which the motor is to be energized in the embodiment illustrated in Fig. 1. Line 6 is accordingly connected with the primary winding 7 of a transformer having a secondary winding 8 comprising a plurality of phase displaced portions 8a, 8b, and 8c connected to form a neutral point. Such portions are severally connected with the cathodes 9, 11 and 12 of three discontinuously controllable electric valves 13, 14 and 16 herein represented as rectifiers of the mercury arc type.

The rectifiers are provided with a plurality of anodes connected in groups such as the group comprising anodes 17, 18 and 19, the anodes of each group being jointly connected with one of the portions such as 21a of the armature winding 21 of the motor 22. Such motor may be of any suitable type such as a motor of the so-called synchronous type in which the several portions of the armature winding are circumferentially spaced and are connected in star to form a neutral point.

The neutral points of windings 21 and 8 are interconnected and, as will be explained hereinafter, the connection therebetween receives rectified current of substantially uniform intensity which may therefore be utilized for energizing the field winding 23 of the motor to impart series characteristics thereto. It will be understood, however, that other means may be utilized for energizing winding 23 in accordance with the characteristics desired for the motor. The flow of current between windings 8 and 21 is preferably smoothed by means of a reactor 24 inserted therebetween.

The flow of current through each group of anodes of the rectifiers is controlled by a group of control electrodes such as 27, 28 and 29 of a type operable to interrupt the flow of current through the anodes at will upon energization of the control electrodes at a suitable potential from a suitable source. If rectifiers 13, 14 and 16 are of the vacuum type, the usual type of control electrode may be utilized. If the rectifiers are however of the vapor type, each control electrode must be capable of removing the positive ionic charges present in the space between the anode and the control electrode at a rate greater than the rate of appearance of ions within such space. Such appearance of ions may be the result of collisions between electrons and vapor atoms or of wandering of ions from the space outside the control electrode through the openings thereof. In addition to the above mentioned removal of ionic charges, the control electrode should also cause repulsion of the electrons produced at the cathode or in the space outside the control electrode so as to prevent any further transport of charges to the anode. To obtain such result without resorting to the energization of the control electrode at such high potential as to introduce disturbances in the operation of the rectifier the dimensions of the control electrode cannot be chosen arbitrarily but must be within predetermined limits. It has been found, for instance, that the desired result can be obtained by means of a control electrode having the openings thereof, which are available for the passage of the discharge, so dimensioned that the ion sheaths formed about the several portions of the control electrode structure entirely fill such openings when the control electrode is unenergized and is not traversed by the arc. In addition to the above mentioned overlapping of the ion sheaths, it is preferable to provide the openings in such numbers that their total area is approximately equal to forty percent of the area of the anode in contact with the discharge, to make the distance between the control electrode and the anode substantially equal to the mean free path of the electrons, and to provide the area of the control electrodes in contact with the space contained between such electrode and the associated anode plus the total area of the surfaces of such control electrode forming the openings thereof, equal to at least two and one-half times the total cross sectional area of such openings. It will be understood, however, that control electrodes of dimensions other than the above are also suitable for obtaining the desired result.
The discharges occurring at the anodes are preferably also caused to come in contact with other electrodes such as electrodes 31, 32 and 33 connected with the anodes through resistors 34, 36 and 37, the purpose of each such electrode being to carry an uncontrolled current ionizing the discharge path of the associated anode and also to dissipate the surges appearing at the anode upon interruption of the flow of current therethrough by means of the control electrode.
Control electrodes 27, 28 and 29 are severally connected through resistors 38, 39 and 41 and 42, 43 and 44 with the negative terminals of suitable sources of potential such as batteries 46, 47 and 48. Such batteries are provided with intermediate taps severally connected with cathodes 9, 11 and 12 to thereby maintain the terminal potentials of the batteries in definite relation with the potentials of the cathodes. The control electrodes are further connected through the first mentioned resistors with segments of distributors 49, 51 and 52 each provided with a plurality of conductive segments and provided with brushes 53, 54 and 56 driven by the shaft of motor 22. Such brushes are connected with segments of three further distributors 57, 58 and 59 each provided with a single conductive segment such as 60 and having brushes 61, 62 and 63. The latter brushes are driven in relation with the voltage cycle of line 6, such result being obtained by any suitable means such as a synchronous motor 64 energized from line 6. The operation of the distributors may be adjusted by suitable adjusting means such as levers 66 and 67 operable to spatially displace the segments of the distributors. Brushes 61, 62 and 63 are severally connected with the positive terminals of batteries 46, 47 and 48 whereby positive electromotive forces may be impressed on the control electrodes through circuits each comprising one distributor of each group connected in series. It will be understood that although the connections of only one group of control electrodes were described the remaining groups of control electrodes are connected in a similar manner with the batteries and with further segments of distributors 49, 51 and 52.

In operation, line 6 being energized, motor 64 is started and brought to synchronous operation by any well known means. Brushes 61, 62 and 63 are thus each caused to engage with the conductive segment of the associated distributor once during each cycle of the voltage of line 6. In the present embodiment, the segments of the distributors are so arranged that the circuits of brushes 61, 62 and 63 are completed in sequence at intervals of one-third of a cycle and each remains closed during a third of a cycle. Winding 7 is energized from line 6 and causes a three-phase system of electromotive forces to appear between the several terminals and the neutral point of winding 8. Assuming that, at the instant considered, the electromotive force appearing between the neutral point and the terminals of winding portion 8c is negative with respect to the neutral point of winding 8, such electromotive force is therefore positive with respect to the potential of cathode 12, and brings anode 19 to a positive potential with respect to cathode 12 through portion 21a of winding 21.

All the control electrodes of the rectifiers are generally maintained negative with respect to the associated cathodes as a result of the connection thereof with the negative terminals of batteries 46, 47 and 48. Lever 67 is so adjusted that brush 63 then comes into contact with the conductive segment of distributor 59 to connect brush 56 with the positive terminal of battery 48. Lever 66 is correspondingly adjusted to cause distributor 52 to complete the connection of the particular control electrode of rectifier 16 controlling the flow of current through the desired portion of winding 21. Assuming that winding portion 21a is to receive current, distributor 52 completes the connection of control electrode 29 with battery 48 to release the flow of current through anode 19. Such flow of current then occurs from winding portion 8c through reactor 24, field winding 23, winding portion 21a, anode 19 and cathode 12 back to winding portion 8c.

After an interval of one-third of a cycle, brush 63 leaves the conductive segment of distributor 59 and control electrode 29 therefore, due to connection with battery 48, again becomes negative with respect to cathode 12 to thereby interrupt the flow of current through anode 19. The magnetic energy stored within winding portion 8c is then discharged over electrode 33. Brush 61 simultaneously engages with the conductive segment 60 of distributor 57 to thereby complete the connection of control electrode 27 with the positive terminal of battery 46. A flow of current is then released through anode 17 from winding portion 8a which then impresses a positive potential on the anode, through a circuit similar to that described above. After a further interval of one-third of a cycle, distributor 58 causes energization of control electrode 28 to release the flow of current through anode 18 which is then positively energized from winding portion 8b.

The above sequence of operations is repeated once during each cycle of the voltage of line 6 to cause a flow of substantially uniform direct current through winding portion 21a and through field winding 23. The particular portion 21a of winding 21 is so selected that such flow of current causes a torque to be impressed on the shaft of the motor. The motor therefore begins to rotate, thereby causing brushes 53, 54 and 56 to disengage the contacts completing the connection of control electrodes 27, 28 and 29 and to engage with another set of contacts controlling the energization of another group of control electrodes of the rectifiers. As a result of such action winding portion 21a ceases receiving current and current flows through another portion of winding 21 which then has come in substantially the position occupied by winding 21a at the instant previously considered. Such flow of current theerfore causes a torque of the same direction to be impressed on the shaft of the motor to cause further rotation thereof. Such action is repeated for every portion of winding 21 during each revolution of the motor.

By adjusting the position of lever 66, the relative position of the armature winding portions receiving current with respect to the field of the motor may be selected to thereby cause the torque impressed on the shaft of the motor to be adjusted in magnitude and in direction. Such torque may also be varied by adjustment of lever 67 to determine the portion of the voltage cycle of line 6 over which current is carried by the several portions of winding 8. If each winding portion, such as 8a, carries current when the voltage thereof is positive and greater than the voltages of both other portions, the flow of current therethrough will be a maximum and the torque impressed on the motor will be a maximum. The flow of current through windings 7 and 8 will then occur at a power factor of high value. If lever 67 is so adjusted that the flow of current through winding 8 lags behind the voltage, the torque of the motor will be decreased and the power factor of the current received from line 6 will be lagging. If the flow of current through winding 8 is caused to lead the voltage, the torque of the motor will likewise be decreased and the power factor of the current received by winding 7 will be leading. Such result may be obtained due to the interrupting action of the control electrodes and is thus entirely independent of the action of the counter-electromotive forces of winding 21.

In a system operating as above described, the control electrodes such as 27, 28 and 29, which are operative to interrupt the flow of current through anodes such as 17, 18 and 19, are arranged in groups severally associated with the groups of anodes. As a result of the connection of the control electrodes with batteries 46, 47 and 48 through resistors 38, 39 and 41 and also through the circuits comprising distributors 57, 58 and 59, such control electrodes sequentially release the flow of current through the several anodes of each group, the flow of current through each of the anodes being interrupted upon release of the flow of current through another anode of the same group. Batteries 46, 47 and 48 constitute the sources of control electromotive forces or the energizing means for the control electrodes. Distributors 49, 51 and 52 are operable in response to the rotation of motor 22 to control the energization of the control electrodes, brushes 53, 54 and 56 being driven by the motor so as to aid in controlling such energization. Distributors 57, 58 and 59 are operated from line 6 in relation with the voltage cycle thereof and therefore operate independently of motor 22, and are connected with distributors 49, 51 and 52 to cooperate therewith in sequentially impressing electromotive forces on the control electrodes of each group.

In the embodiment illustrated in Fig. 2, motor 22 is supplied with current from a single phase alternating current line 68 through a transformer 69 having a secondary winding 71 comprising two portions 71a and 71b. Such portions are connected with motor 22 and with cathodes 9 and 11 in a manner similar to the manner of connection of winding 8 in the embodiment illustrated in Fig. 1. In the present embodiment, rectifier 16 as well as distributors 59 and 52 controlling the operation of such rectifier are omitted. Transformer 69 is provided with auxiliary windings 72 and 73, the purpose of which will appear hereinafter. Each anode such as 17 of rectifier 13 is connected through a capacitor such as 74 with a separate auxiliary anode or with a common auxiliary anode 76 of rectifier 13. Each anode of rectifier 14 is similarly connected with a separate anode or with a common anode 78 of rectifier 14 through a capacitor such as 77. Anode 76 is connected with cathode 9 through a rectifying device such as an electric valve 79, suitable impedance means 81, and winding 72. Anode 78 is similarly connected with cathode 11 through electric valve 82, impedance means 83 and winding 73. Anode 76 is provided with a control electrode 84 operable to prevent and to release the flow of current therethrough. Such control electrode is connected with the negative terminal of battery 46 through resistors 86 and 87 and is also connected through resistor 86 with an additional conductive segment 88 provided on distributor 57. In the present embodiment the segment 60 of distributor 57 connected with brush 53 of distributor 49 extends over an angle of substantially 180 degrees to permit contact of brush 61 therewith over time intervals equal to one-half cycle of the voltage of line 68. Anode 78 is similarly provided with a control electrode 89 connected with battery 48 through resistors 91 and 92 and also connected through resistor 91 with an additional segment 93 of distributor 58.

In the present embodiment the energization of the control electrodes of the main anodes is effected in a manner similar to that of the embodiment illustrated in Fig. 1 except that each control electrode is energized through distributors 57 and 58 over intervals equal to one-half cycle of the voltage of line 6 to permit the flow of current through the associated anode over time intervals likewise equal to one-half cycle. The flow of current through the anodes is further controlled by the action of capacitors such as 74 and 77 in the following manner. It will first be assumed that winding portion 71a impresses on anode 17 a negative potential, with respect to the potential of cathode 9, through winding portion 21a. Flow of current then cannot occur through rectifier 13 as a result of the valve action thereof. Winding 72 then impresses a positive electromotive force between cathode 9 and anode 76 through valve 79 and impedance means 81. Anode 76 is brought to a high positive potential with respect to anode 17 to thereby charge capacitor 74. During the next half cycle, anode 17 becomes positive with respect to cathode 9 whereas anode 76 becomes negative with respect to such cathode, but the charge of capacitor 74 cannot reverse nor even decrease because of the valve action of valve 79 and of anode 76, so that the potential of anode 76 follows the variations of the potential of anode 17, the potential difference between such anodes remaining constant.

When brush 61 engages with segment 60 of distributor 57 to connect control electrode 27 with battery 46 the flow of current through anode 17 is released. After an interval of substantially one-half cycle, brush 61 leaves the segment 60 of distributor 57 and control electrode 27 is again made negative to cause interruption of the flow of current through anode 17. Brush 61 then engages with segment 88, thereby causing control electrode 84 to become positive with respect to cathode 9 and releasing the flow of current through anode 76. Such anode, which is highly positive with respect to anode 17, immediately carries current to discharge condenser 74. While such discharge is in progress anode 76 is at a potential higher than the potential of cathode 9 by the amount of the arc drop within rectifier 13 and anode 17, which is negative with respect to anode 76, is therefore brought to a potential insufficient to maintain the discharge between anode 17 and cathode 9 or even to a negative potential with respect to the potential of cathode 9, thus making further flow of current between anode 17 and cathode 9 impossible. Capacitor 74 and anode 76 thus aid the action of control electrode 27 in interrupting the flow of current through anode 17. The action of the remaining controlling electrodes of rectifiers 13 and 14 is similarly aided by the action of capacitors associated with the remaining anodes. It is thus possible to safely control the flow of current through the rectifiers even when there is a danger of faulty operation of the control electrodes. Such control electrodes operate satisfactorily only when predetermined conditions of load and of temperature and pressure within the rectifier, under which conditions the action of the capacitors is therefore superfluous. When it is desired, however, to operate rectifiers 13 and 14 outside of the range of load, pressure and temperature within which the interrupting action of the control electrodes is obtained, the capacitors will aid in such interrupting action and may even suffice to produce such action without the aid of the control electrodes. Under such conditions the control electrodes have only the function of preventing the flow of current through the associated anodes during the idle periods thereof and of releasing such flow of current to initiate active operation thereof.

In the present embodiment therefore the distributors and the control electrodes sequentially impress, on the control electrodes of each group, electromotive forces from the batteries of signs and magnitudes operative to recurringly prevent and to release the flow of current through the anodes while anodes 76 and 78 and capacitors 74 and 77 cause interruption of the flow of current through each of the anodes upon release of the flow of current through the other anode of the same groups.

Although but two embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a motor control system, an electric current supply line, a motor having an armature winding and a field winding, means for connecting said windings with said line, discontinuously controllable electric valve means having a plurality of anodes connected with said armature winding and controlling the flow of current therethrough, control electrodes operative to interrupt the flow of currents through said anodes, energizing means for said control electrodes, and means operable in response to rotation of said motor for controlling the energization of said control electrodes from said energizing means.

2. In a motor control system, an electric current supply line, a motor having an armature winding and a field winding, means for connecting said windings with said line, discontinuously controllable electric valve means having a plurality of anodes connected with said armature winding and controlling the flow of current therethrough, control electrodes operative to interrupt the flow of currents through said anodes, energizing means for said control electrodes, means driven by said motor to aid in controlling the energization of said control electrodes from said energizing means, and means operating independently of said motor and connected with the fourth said means and cooperating therewith to control the energization of said electrodes from said energizing means to thereby control the flow of current through said winding.

3. In a motor control system, an electric current supply line, a motor having an armature winding and a field winding, means for connecting said windings with said line, discontinuously controllable electric valve means having a plurality of anodes connected with said armature winding and controlling the flow of current therethrough, control electrodes operative to interrupt the flow of currents through said anodes, energizing means for said control electrodes, means driven by said motor to aid in controlling the energization of said control electrodes from said energizing means, and means operated from said line and connected with the fourth said means and cooperating therewith to control the energization of said electrodes from said energizing means to thereby control the flow of current through said winding.

4. In a motor control system, an electric current supply line, a motor having an armature winding and a field winding, means for connecting said windings with said line, discontinuously controllable electric valve means having a plurality of anodes connected with said armature winding and controlling the flow of current therethrough, control electrodes operative to interrupt the flow of currents through said anodes, energizing means for said control electrodes, means operable in response to rotation of said motor for controlling the energization of said control electrodes from said energizing means, and means for varying the action of the last said means.

5. In a motor control system, an electric current supply line, a motor having an armature winding and a field winding, means for connecting said windings with said line, discontinuously controllable electric valve means having a plurality of anodes connected with said armature winding and controlling the flow of current therethrough, control electrodes operative to interrupt the flow of currents through said anodes, energizing means for said control electrodes, means driven by said motor to aid in controlling the energization of said control electrodes from said energizing means, means operating independently of said motor and connected with the last said means and cooperating therewith to control the operation of said valve means, and means for varying the action of the last said means.

6. In a motor control system, an electric current supply line, a motor having an armature winding and a field winding, means for connecting said windings with said line, discontinuously controllable electric valve means having a plurality of anodes connected with said armature winding and controlling the flow of current therethrough, control electrodes operative to interrupt the flow of currents through said anodes, energizing means for said control electrodes, means driven by said motor to aid in controlling the energization of said control electrodes from said energizing means, means operating independently of said motor and connected with the last said means and cooperating therewith to control the operation of said valve means, and means for varying the action of the last two said means.

7. In a motor control system, an electric current supply line, a motor having an armature winding and a field winding, means for connecting said windings with said line, discontinuously controllable electric valve means having a plurality of anodes arranged in groups jointly connected with said armature winding and controlling the flow of current therethrough, and means for sequentially releasing the flow of current through the anodes of each said group and for interrupting the flow of current through each of said anodes upon release of the flow of current through another anode of the same group.

8. In a motor control system, an electric current supply line, a motor having an armature winding and a field winding, means for connecting said windings with said line, discontinuously controllable electric valve means having a plurality of anodes arranged in groups jointly connected with said armature winding and controlling the flow of current therethrough, control electrodes arranged in groups severally associated with said groups of anodes, sources of control electromotive forces, means for sequentially impressing on the control electrodes of each group electromotive forces from said sources of signs and magnitudes operative to recurringly prevent and to release the flow of current through said anodes, and means for interrupting the flow of current through each of said anodes upon release of the flow of current through another anode of the same group.

9. In a motor control system, an electric current supply line, a motor having an armature winding and a field winding, means for connecting said windings with said line, discontinuously controllable electric valve means having a plurality of anodes arranged in groups jointly connected with said armature winding and controlling the flow of current therethrough, control electrodes arranged in groups severally associated with said groups of anodes, sources of control electromotive forces, means for sequentially impressing on the control electrodes of each group electromotive forces from said sources of signs and magnitudes operative to recurringly prevent and to release the flow of current through said anodes, auxiliary anodes in said valve means, a plurality of capacitors severally connected with the first and last said anodes, control electrodes associated with the last said anodes, means for intermittently impressing on the last said anodes recurring positive electromotive forces with respect to the first said anodes to thereby recurringly charge said capacitors, and means operating in synchronism with the second said means for controlling the last said control electrodes to cause recurring discharge of each of said capacitors through the associated one of the second said anodes, whereby the flow of currents sequentially released through the several anodes of each group is interrupted, and means operable in response to rotation of said motor and controlling the operation of the second said means whereby current is caused to flow through the several groups of first said anodes in sequence.

10. In a motor control system, an alternating current supply line, a motor having an armature winding and a field winding, means for connecting said windings with said line, discontinuously controllable electric valve means having a plurality of anodes arranged in groups jointly connected with said armature winding and controlling the flow of current therethrough, control electrodes arranged in groups severally associated with said groups of anodes, sources of control electromotive forces operating in relation with the voltage cycle of said supply line, means for sequentially impressing on the control electrodes of each group electromotive forces from said sources of signs and magnitudes operative to recurringly prevent and to release the flow of current through said anodes, auxiliary anodes in said valve means, a plurality of capacitors connected with the first and last said anodes, control electrodes associated with the last said anodes, means for intermittently impressing on the last said anodes recurring positive electromotive forces with respect to the first said anodes to thereby recurringly charge said capacitors, and means operating in synchronism with the second said means for controlling the last said control electrodes to cause recurring discharge of each of said capacitors through the associated one of the second said anodes whereby the flows of current sequentially released through the several anodes of each group are interrupted, and means operable in response to rotation of said motor controlling the operation of the second said means whereby current is caused to flow through the several groups of the first said anodes in sequence.

11. In a motor control system, an alternating current supply line, a transformer having a primary winding connected with said line and having a secondary winding comprising a plurality of portions connected to form a neutral point, a motor having a field winding and having an armature winding comprising a plurality of portions connected to form a neutral point, means for interconnecting the first and second said neutral points, a plurality of electric valves each having anodes severally connected with the different portions of said armature winding and each having a cathode connected with a different one of said secondary winding portions, control electrodes severally associated with said anodes, and means for energizing said control electrodes to control the flow of current through said motor.

12. In a motor control system, an alternating current supply line, a transformer having a primary winding connected with said line and having a secondary winding comprising a plurality of portions connected to form a neutral point, a motor having a field winding and having an armature winding comprising a plurality of portions connected to form a neutral point, means for interconnecting the first and second said neutral points, a plurality of electric valves each having anodes severally connected with the different portions of said armature winding and each having a cathode connected with a different one of said secondary winding portions, control electrodes severally associated with said anodes, energizing means for said control electrodes, and means operable in response to rotation of said motor for controlling the energization of said control electrodes from said energizing means.

13. In a motor control system, an alternating current supply line, a transformer having a primary winding connected with said line and having a secondary winding comprising a plurality of portions connected to form a neutral point, a motor having a field winding and having an armature winding comprising a plurality of portions connected to form a neutral point, means for interconnecting the first and second said neutral points, a plurality of electric valves each having anodes severally connected with the different portions of said armature winding and each having a cathode connected with a different one of said secondary winding portions, control electrodes severally associated with said anodes, energizing means for said control electrodes, means driven by said motor to aid in controlling the energization of said control electrodes from said energizing means, and means operating in relation with the voltage cycle of said line and connected with the last said means and cooperating therewith to control the operation of said valves.

14. In a motor control system, an alternating current supply line, a transformer having a primary winding connected with said line and having a secondary winding comprising a plurality of portions connected to form a neutral point, a motor having a field winding and having an armature winding comprising a plurality of portions connected to form a neutral point, means for interconnecting the first and second said neutral points, a plurality of electric valves each having anodes severally connected with the different portions of said armature winding and each having a cathode connected with a different one of said secondary winding portions, control electrodes severally associated with said anodes, means for energizing said control electrodes to control the flow of current through said motor, and means for varying the action of the last said means.

15. In a motor control system, an alternating current supply line, a transformer having a primary winding connected with said line and having a secondary winding comprising a plurality of portions connected to form a neutral point, a motor having a field winding and having an armature winding comprising a plurality of portions connected to form a neutral point, means for interconnecting the first and second said neutral points, a plurality of electric valves each having anodes severally connected with the different portions of said armature winding and each having a cathode connected with a different one of said secondary winding portions, control electrodes severally associated with said anodes, means for energizing said control electrodes to control the flow of current through said motor, and means for varying the action of the last two said means.

16. In a motor control system, an electric current supply circuit, an electric motor comprising an armature winding, discontinuously controllable electric valve means comprising a plurality of main anodes arranged in a plurality of groups jointly connecting said circuit with said winding and controlling the flow of current therethrough, auxiliary anodes severally associated with said groups of main anodes, a plurality of capacitors severally connecting the said auxiliary anodes with said main anodes, means for continually impressing on said auxiliary anodes electromotive forces of such sign and magnitude as to recurringly charge said capacitors, control electrodes severally associated with said auxiliary electrodes, and means for controlling said control electrodes to cause recurring discharge of said capacitors through said auxiliary anodes whereby the flow of current through the corresponding connected ones of said main anodes is interrupted.

17. In a motor control system, an electric current supply circuit, an electric motor comprising an armature winding, discontinuously controllable electric valve means comprising a plurality of main anodes arranged in a plurality of groups jointly connecting said circuit with said winding and controlling the flow of current therethrough, auxiliary anodes severally associated with said groups of main anodes, a plurality of capacitors severally connecting said auxiliary anodes with said main anodes, means for continually impressing electromotive forces of uni-direction on said auxiliary anodes of such sign and magnitude as to recurringly charge said capacitors, control electrodes severally associated with said auxiliary anodes, and means for controlling said control electrodes to cause recurring discharge of said capacitors through said auxiliary anodes whereby the flow of current through the corresponding connected ones of said main anodes is interrupted.

18. In a motor control system, an electric current supply circuit, an electric motor comprising an armature winding, discontinuously controllable electric valve means comprising a plurality of main anodes divided into groups jointly connecting said circuit with said winding and controlling the flow of current therethrough, auxiliary anodes severally associated with said groups of main anodes, a plurality of capacitors severally connecting said auxiliary anodes with said main anodes, means comprising a source of alternating current and auxiliary electric valve means for continually impressing electromotive forces of uni-direction on said auxiliary anodes of such sign and magnitude as to recurringly charge said capacitors, control electrodes severally associated with said auxiliary anodes, and means for controlling said control electrodes to cause recurring discharge of said capacitors through said auxiliary anodes whereby the flow of current through the corresponding connected ones of said main anodes is interrupted.

19. In combination with an electric motor comprising a winding divided into a plurality of angularly displaced portions, a source of alternating current for exciting said winding to operate said motor, and means for controlling the flow of current from said source sequentially through said winding portions comprising a plurality of electric valves each having a cathode connected with said source of current and a plurality of main anodes severally connected with said winding portions, of a plurality of auxiliary anodes severally constituting an element of each of said valves, a plurality of capacitors severally connecting said main anodes of each of said valves with the said auxiliary anode thereof, means for continually impressing electromotive forces on each of said auxiliary anodes of such sign and magnitude and during such moments as to recurringly charge said capacitors, a plurality of control electrodes severally associated with said auxiliary anodes, means for continually impressing electromotive forces on said control electrodes of such sign and magnitude and during such moments as to cause recurring discharge of said capacitors by way of said auxiliary anodes whereby the flow of current through the corresponding connected ones of said main anodes is interrupted, the second said means including means operable in dependence on the voltage frequency of said source of current.

ERWIN KERN.